(No Model.)

P. WHITE.
DRIVING GEAR FOR HOISTING DRUMS.

No. 489,355. Patented Jan. 3, 1893.

WITNESSES:
C. Neveux
C. Sedgwick

INVENTOR
P. White
BY
Munn & Co
ATTORNEYS.

UNITED STATES PATENT OFFICE.

PATRICK WHITE, OF PERTH AMBOY, NEW JERSEY.

DRIVING-GEAR FOR HOISTING-DRUMS.

SPECIFICATION forming part of Letters Patent No. 489,355, dated January 3, 1893.

Application filed April 13, 1892. Serial No. 429,045. (No model.)

*To all whom it may concern:*

Be it known that I, PATRICK WHITE, of Perth Amboy, in the county of Middlesex and State of New Jersey, have invented a new and Improved Driving-Gear for Hoisting-Drums, of which the following is a full, clear, and exact description.

The aim of the invention is to improve hoisting devices of the general form shown in United States Letters Patent granted to A. J. Davis on September 23, 1879, and September 2, 1884, and numbered respectively 219,922 and 304,300.

The present invention is distinguished by an improved gear wheel so formed that parts may be renewed when damaged, without a loss of the whole, and by novel means of retaining the friction blocks of the friction clutch.

Reference is to be had to the accompanying drawings forming a part of this specification, in which similar letters of reference indicate corresponding parts in all the figures.

Figure 1:
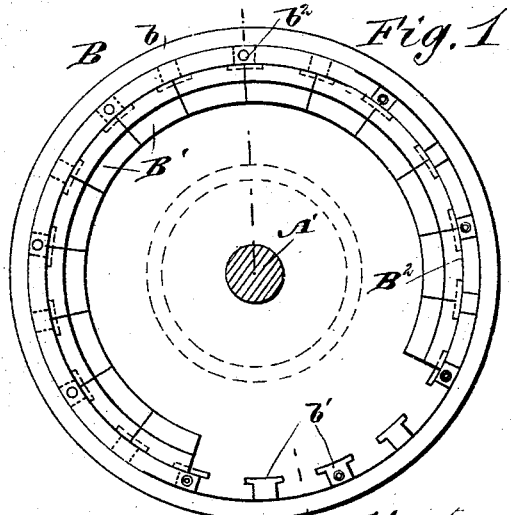
Figure 3:
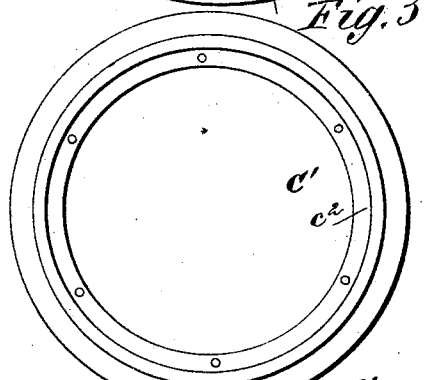
Figure 2:
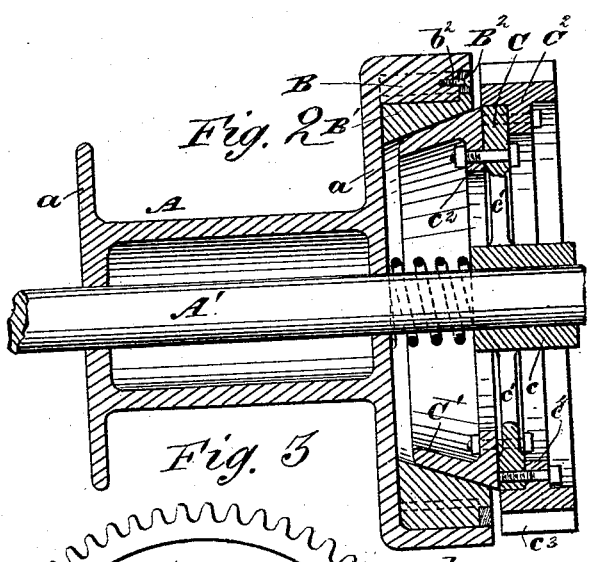
Figure 4:
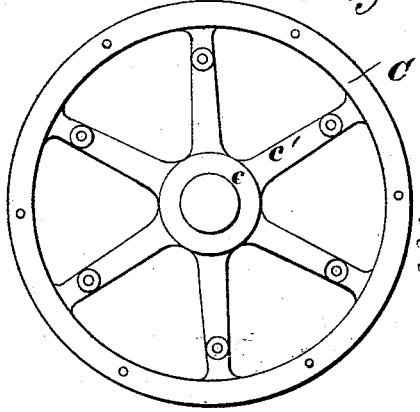
Figure 5:
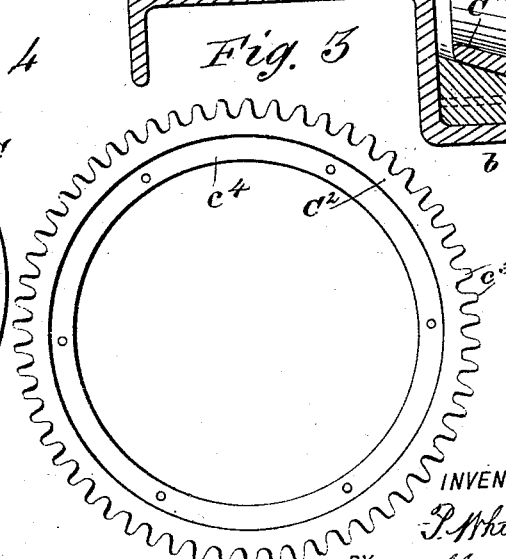

Figure 1 is a face view of the driven member of the clutch which is formed on the hoisting drum, with parts omitted; Fig. 2 is a longitudinal section through the drive wheel, clutch and hoisting drum; and Figs. 3, 4 and 5 are detail views of the separate parts of the drive wheel.

The hoisting drum A, is mounted loosely on the drive shaft A', and integrally with one of its flanges $a$, is the driven section B, of the friction clutch, such section consisting of an integral rim $b$, on the flange $a$, and the friction blocks B', of wood. The blocks are so formed on the side faces as to be received between the cruciform lugs $a'$, formed on the rim $b$, the right angled shoulders formed by such lugs being preferable in my opinion to dovetails.

In order to prevent outward movement of the friction blocks, I provide a retainer ring $B^2$, which overlies the face of the blocks and preferably is let into the same, and secured in place by screws $b^2$, or the like, which take into the lugs $b'$.

My improved drive wheel is constructed as follows: From the hub $c$, a rim C, is supported by spokes $c'$, or an equivalent web, and to said spokes the drive section C' of the clutch is secured, the said clutch section being conical to contact with the inner corresponding surface of the driven section B, and being further formed with a radial flange $c^2$ which is bolted to the spokes. The gear teeth $c^3$, of the drive wheel are formed on a rim $C^2$ which is provided with an internal annular flange $c^4$, the flange being bolted to the rim C, as shown. Thus should it be desired to renew either the rim $C^2$ by reason of the breakage of its teeth, or other part, it may be readily effected without the necessity of renewing the complete drive wheel.

Having thus described my invention what I claim as new, and desire to secure by Letters Patent, is—

1. In driving mechanism for hoisting drums, the combination, with a drive wheel constructed with a removble rim having gear teeth and having a removable drive section of a friction clutch, of a hoisting drum carrying the driven section of the friction clutch, the latter consisting of an integral rim on one end of the hoisting drum, friction blocks held to the said rim by cruciform lugs thereon, and a retainer ring on the said rim, overlying the faces of said blocks and serving to prevent outward movement thereof, substantially as described.

2. In a driving mechanism for hoisting drums, a friction clutch consisting of a drive section, and a driven section having separate friction blocks, supported on lugs on the metallic part of the wheel, and a retainer ring held to the said metallic part, and overlying the friction blocks, substantially as described.

3. In a driving mechanism for hoisting drums, the combination of the hoisting drum, drive wheel, and friction clutch, the driven section of the clutch being carried by the drum, and the drive section being removably held to the drive wheel, and the latter consisting of a rim supported integral with the hub and a second rim having gear teeth and held removably to the first named rim, substantially as described.

PATRICK WHITE.

Witnesses:
PETER ANDREAS JOHANSEN,
JAMES HENRY WHITE.